United States Patent
Mohtar

[19]

[11] Patent Number: 6,135,414
[45] Date of Patent: Oct. 24, 2000

[54] BALL VALVE APPARATUS

[75] Inventor: Rafic Mohtar, Harbor City, Calif.

[73] Assignee: Whittaker Corporation, Simi Valley, Calif.

[21] Appl. No.: 09/220,842

[22] Filed: Dec. 24, 1998

[51] Int. Cl.[7] ............................................. F16K 31/122
[52] U.S. Cl. ........................ 251/58; 251/62; 251/174; 251/279; 251/315.01; 137/595
[58] Field of Search ............................ 137/595; 251/174, 251/315.01, 58, 279, 62

[56] References Cited

U.S. PATENT DOCUMENTS

| | | | |
|---|---|---|---|
| 3,220,694 | 11/1965 | Eschbaugh | 251/174 |
| 3,762,682 | 10/1973 | Franck | 251/209 X |
| 4,412,556 | 11/1983 | Janich | 251/279 X |
| 4,533,113 | 8/1985 | Francart, Jr. | 137/595 X |
| 4,632,082 | 12/1986 | Hattori et al. | 137/595 X |
| 4,765,589 | 8/1988 | Sauze | 251/279 X |
| 4,823,748 | 4/1989 | Ampferer et al. | 137/595 X |
| 4,881,718 | 11/1989 | Champagne | 251/209 |
| 4,977,791 | 12/1990 | Erichsen | 251/58 X |
| 5,542,643 | 8/1996 | Breth | 251/62 |
| 5,551,467 | 9/1996 | Booth et al. | 251/315.01 X |

*Primary Examiner*—Kevin Shaver
*Assistant Examiner*—John Bastianelli
*Attorney, Agent, or Firm*—Henry M. Bissell

[57] ABSTRACT

Apparatus for coordinating the positions of valves in a pair of air flow passages along a jet engine nacelle to control two rotary valves from a single linear actuator. Each of the valves is of a ball type which is rotatable within a housing to achieve variable flow control in accordance with the particular shape of the opening through the rotatable valve member which varies with valve member rotation. The valve member bore shape may differ for the two valves, as well as the angle of the linkage between the linear actuator and each valve, to achieve different flow control relationships for the two valves from the single actuator armature. Each valve incorporates a pressure balancing member at the inlet seal of the valve which results in a reduction of the force of the seal element against the rotatable valve member when the valve is in the closed position, thereby reducing the torque required to rotate the valve out of the closed position.

14 Claims, 6 Drawing Sheets

BALL VALVE APPARATUS

BACKGROUND OF THE INVENTION

1. Field of the Invention

The present invention relates generally to a valve assembly apparatus and, more particularly, to such apparatus including an actuator and a ball type valve.

2. Description of the Related Art

Various types of valves are known in the prior art for throttling fluid flow therethrough. One type, a ball valve, employs a valve member having a spherical shape which is mounted for rotation in a spherical chamber. This spherical valve member, or "ball", generally defines a bore having an axis extending through the center of the sphere. By rotating the ball about an axis normal to the bore axis, the ends of the bore are brought into alignment with the inlet and outlet portions of the valve, thereby effecting the opening of the valve. Continued rotation of the ball about the rotational axis decreases the area of the bore that is exposed to the inlet and outlet portions, thereby reducing flow. Still further rotation positions the bore axis approximately perpendicular to the flow direction, thereby effecting closure of the valve.

In efforts to provide a degree of control over fluid flow through the valve, some valves have incorporated means for throttling the flow passageway through the valve. Usually, this throttling is accomplished by providing a tapered flow passageway or bore extending through the ball, or by reducing the area of the outlet passageway in relation to the area of the inlet passageway.

Examples of such prior art are found in the U.S. Pat. Nos. 3,542,337 and 3,542,338 of Scaramucci and the Franck U.S. Pat. No. 3,762,682.

According to the disclosure in the Lester U.S. Pat. No. 5,593,135, the disclosed valve configuration of the Lester valve strives to achieve a linear relationship between valve rotation and fluid flow. According to the patent, this is accomplished by a cylindrical bore extending almost through the spherical valving member and terminating in a spherically generated throttling wall which contains a generally oblong outlet aperture.

The ball valves of the U.S. Pat. No. 4,846,213 of Hutchins et al., U.S. Pat. No. 4,881,718 of Champagne and U.S. Pat. No. 4,936,547 of Obst as disclosed comprise particularly configured rotatable ball elements designed to achieve asserted beneficial results as the solutions of problems noted in the patents. The valves of Champagne and Obst show grooves located about the rotatable ball member which is said to control cavitation in the fluid flow (Champagne) or variable seating force of the rotatable valve member (Obst). The rotatable ball element of Hutchins et al. has V-shaped openings to accommodate mounting of the ball and associated valve stem at an angle, relative to the fluid flow axis, which facilitate ease of sterilization, cleanability and maintenance of the valve, with ready disassembly for interior access.

Ease of disassembly is also a feature in the disclosed ball valve assembly of Ytzen et al. U.S. Pat. No. 3,456,916. This allows for ready removal of the central valve member for replacement in the event that critical sealing surfaces become damaged or eroded.

Weinhold U.S. Pat. No. 4,027,698 discloses a valve with a generally spherical closure member having a particularly shaped projection into the bore of the rotatable closure member which serves to mate with an opening of the housing so that pressure on the outlet or load side of the valve may be relieved when the valve is in the closed position.

Many applications which presently employ valves to regulate flow could benefit from the capability of a ball valve to achieve a desired relationship of flow area to degree of valve actuation which is non-linear or which may vary in accordance with a prescribed modulation waveform. Known ball valves are not capable of achieving all of the desired features of fine control, modulation of flow area with degree of valve rotation, and adequate flow shutoff which are provided by arrangements of the present invention.

SUMMARY OF THE INVENTION

This invention addresses the need for an improved throttling valve apparatus which provides increased control and the capability to achieve a desired flow modulation waveform relating flow area to degree of valve actuation. This need for a more controllable relationship between flow area and valve actuation has been found to be particularly acute when controlling the flows of hot and cold air from the nacelle to various stages of a turbine engine, in order to control the turbine temperature and therefore size of the turbine blades which vary slightly with temperature. This is important because of the extremely thin space desired between blade tip and engine housing. As the blades grow with increased temperature, there is a danger that they may scrape the inner wall of the housing. On the other hand, if a larger space is provided to accommodate blade tip growth at high temperature, there is loss of efficiency when the blades are operating at lower air temperatures because of the unnecessarily large space between blade tip and housing.

In brief, particular arrangements in accordance with the present invention comprise a structural configuration of a ball valve as well as an actuator assembly incorporating a pair of such valves for controlling the delivery of hot and cold air to different points in the turbine of a jet engine. Each ball valve has a body with opposed inlet and outlet passageways with a valve member located in between. The inlet and outlet passageways of each valve body are generally cylindrical and extend upstream and downstream, respectively, from the valve member.

A cylindrical valve seat member is slidably disposed within the inlet passageway and provides an inner edge bearing against the spherical surface of the valve member for sealing the juncture against leakage. The outer edge of the seat has a groove that accommodates a piston-type ring that serves to limit leakage past the inlet seal. There is a difference in diameter between the inner edge and the outer edge of the valve seat member with the smaller diameter being at the sealing end resulting in a differential area. This difference in diameters results in a small net force due to the pressure applied within the valve seat member which urges the valve seat member in a direction toward the valve member. This force due to the applied pressure adds to the biasing force of a helical spring which surrounds the cylindrical valve seat member and urges it toward the valve member. The biasing force in the spring maintains the seat on the ball against vibrational and maneuver loads. It also reduces leakage at low pressures by providing a known seating force. At high pressures, the force from the pressure acting on the differential area further increases the seating force to reduce leakage.

A valve stem extends through each valve body and is orthogonally aligned to the axis of the fluid passageway through the valve body. Each valve stem is rotatably mounted with bearings and extends from the valve member to a location external to the valve body. A valve member is rotatably mounted within each valve body and is connected to the proximal end of the valve stem.

A crank is attached to the distal end of each valve stem, outside the valve body, to provide leverage. One or more links may be used to connect a yoke to both cranks. With this arrangement, the linear movement of a hydraulic or pneumatic cylinder or other linear actuating means may be translated to rotational forces acting upon each valve stem to operate the valves. The angular position of the crank on the valve stem determines the rotation of the valve stem in response to linear motion of the actuating means. Thus the two valves can be controlled to open at different rates and to different degrees in response to the linear movement of the single actuator.

Each valve member is generally spherical, but defines a flow passageway of predetermined shape. The shape of the flow passageway is established in accordance with the desired relationship between flow area and rotation of the valve member. This can be expressed as a waveform for a given valve member showing extent of flow as a function of rotation of the valve member. The relationship of valve opening to actuator motion, as determined by the linkage between the actuator and the valve stem, is superimposed on this waveform to derive a waveform showing flow rate as a function of actuator movement. This results in a different waveform expressing flow rate as a function of linear movement of the actuator. For two ball valves of the same type, the waveforms of flow rate as a function of actuator movement can be quite different, depending upon the way in which the linkages between the actuator and the valve stems are arranged. Each waveform relates flow, and therefore flow area, to valve actuation.

In the operation of a jet engine, the temperature, and therefore size, of the turbine components must be carefully controlled. The temperature is controlled by the introduction of either hot or cold air, or a combination thereof.

Existing valve assemblies for controlling the flows of hot and cold air to jet turbines employ butterfly valves which employ relatively complex linkages to achieve proper flow control. These linkages introduce play and backlash into the control systems and therefore sacrifice needed accuracy.

By shaping the flow passageway of each valve member of the present invention to provide a desired waveform correlating valve cross-sectional flow area to degree of actuation, the ball valve assembly of the present invention may replace the complex butterfly valve assembly presently in use, with a resulting simplification of structure and enhanced precision of control.

The ball valve assembly of the present invention provides accurate control of flow and simplified valve control linkages. The interchangeability of individual valve members permits the valve assembly to achieve a wide range of flow relationships with easy-to-exchange rotatable valve members in the same valve housings.

BRIEF DESCRIPTION OF THE DRAWINGS

A better understanding of the present invention may be realized from consideration of the following detailed description, taken in conjunction with the accompanying drawings, in which.

DESCRIPTION OF THE PREFERRED EMBODIMENT

Figure 1:
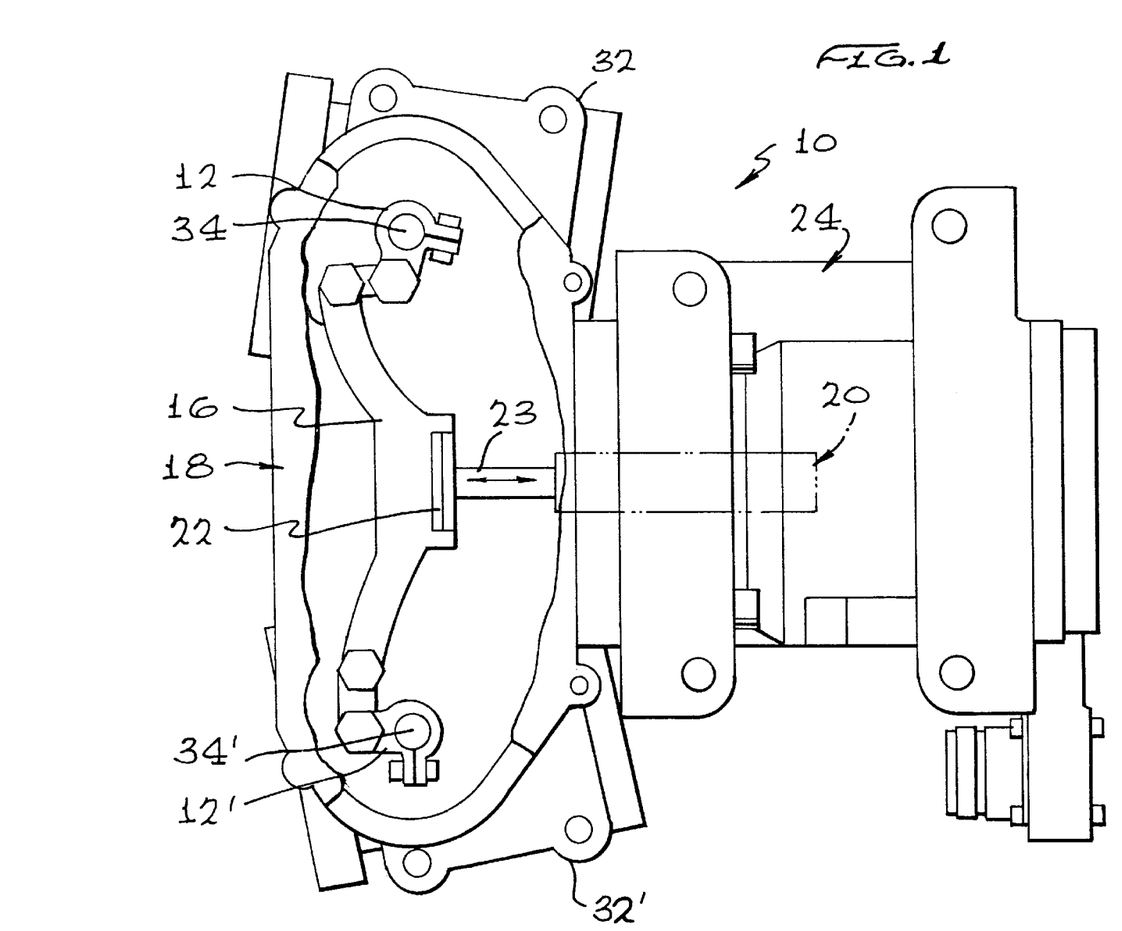
FIG. 1 is a schematic plan view of a dual ball valve assembly, including a pair of ball valves constructed in accordance with the present invention.

Referring to the drawings, and to FIG. 1 in particular, shown therein and generally designated by the reference character 10 is a ball valve assembly constructed in accordance with the present invention. As shown, the ball valve assembly 10 includes two ball valves 30 and 30' having valve bodies 32 and 32', respectively, and mounted in assembly housing 18. Valves 30 and 30' have respective valve stems 34 and 34' extending through assembly housing 18 to be connected with cranks 12 and 12' and through links 14 and 14' to yoke member 16. A linear actuator 20 is shown mounted in a housing member 24, engaged with the yoke 16 by connecting members 22, 23.

Figure 1A:
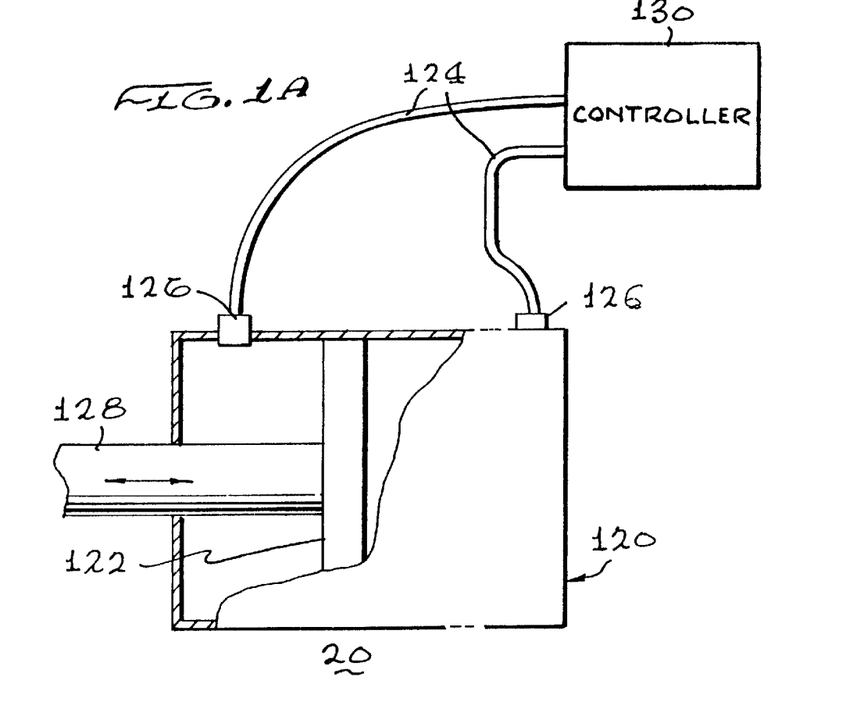
FIG. 1A is a schematic block diagram showing details of the linear actuator depicted in FIG. 1.

The linear actuator 20 of FIG. 1 is depicted schematically in the block diagram of FIG. 1A as comprising a double acting cylinder 120 in which is mounted a piston 122 which is movable back and forth along the cylinder 120 in response pressurized fluid, either air or liquid, which is applied by tubes 124 connected to ports 126 on opposite sides of the piston 122. A piston rod 128 extends out one end of the cylinder 120 from the piston 122 to the connecting member 23 (FIG. 1). The movement and position of the assembly comprising the piston, rod and connecting member 23 are controlled on an analog basis in response to pressurized fluid applied via the tubes 124 from a control element, represented by the block 130.

Figure 2:
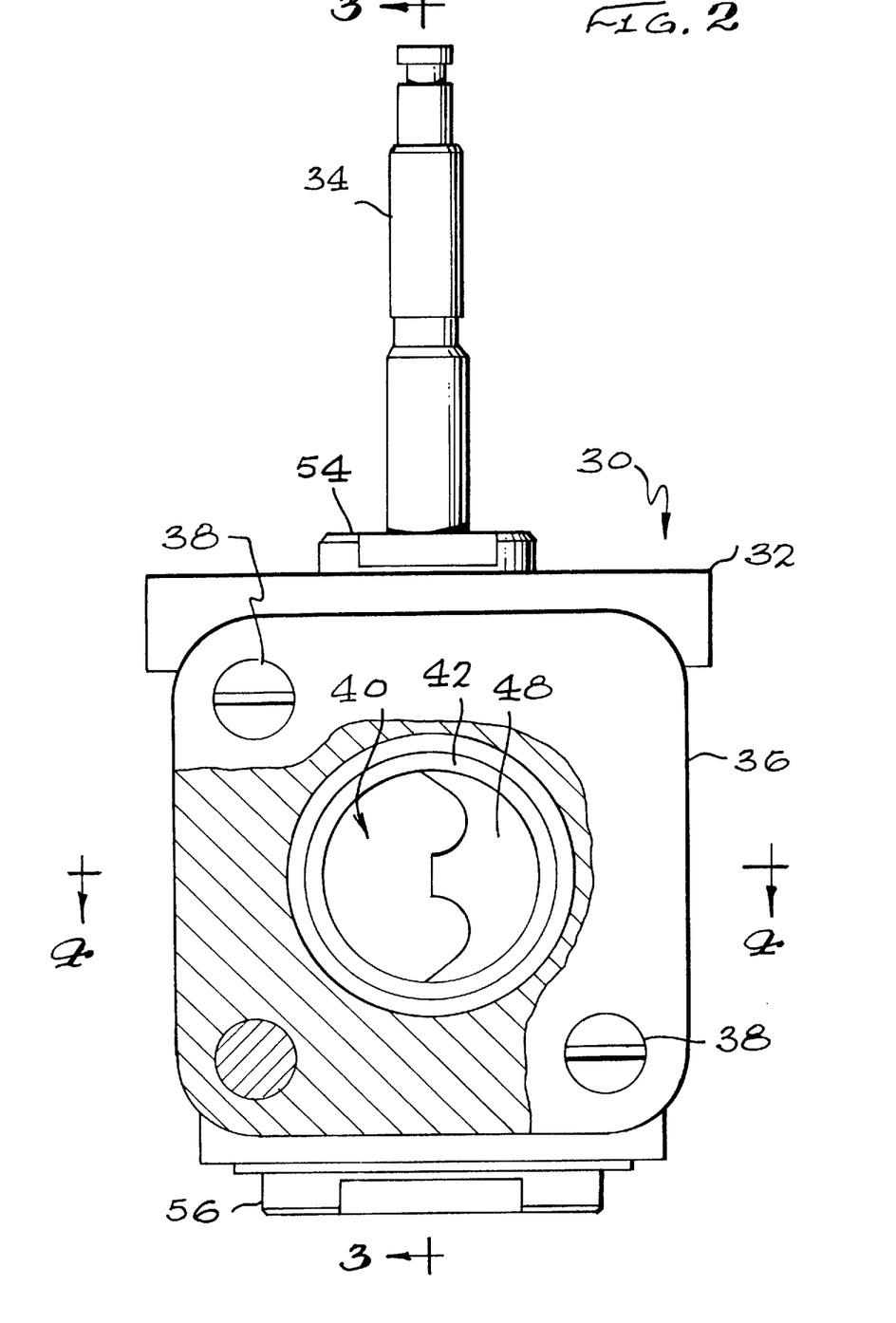
FIG. 2 is a side elevational view, partially broken away, of a single ball valve like those in the assembly of FIG. 1.
Figure 3:
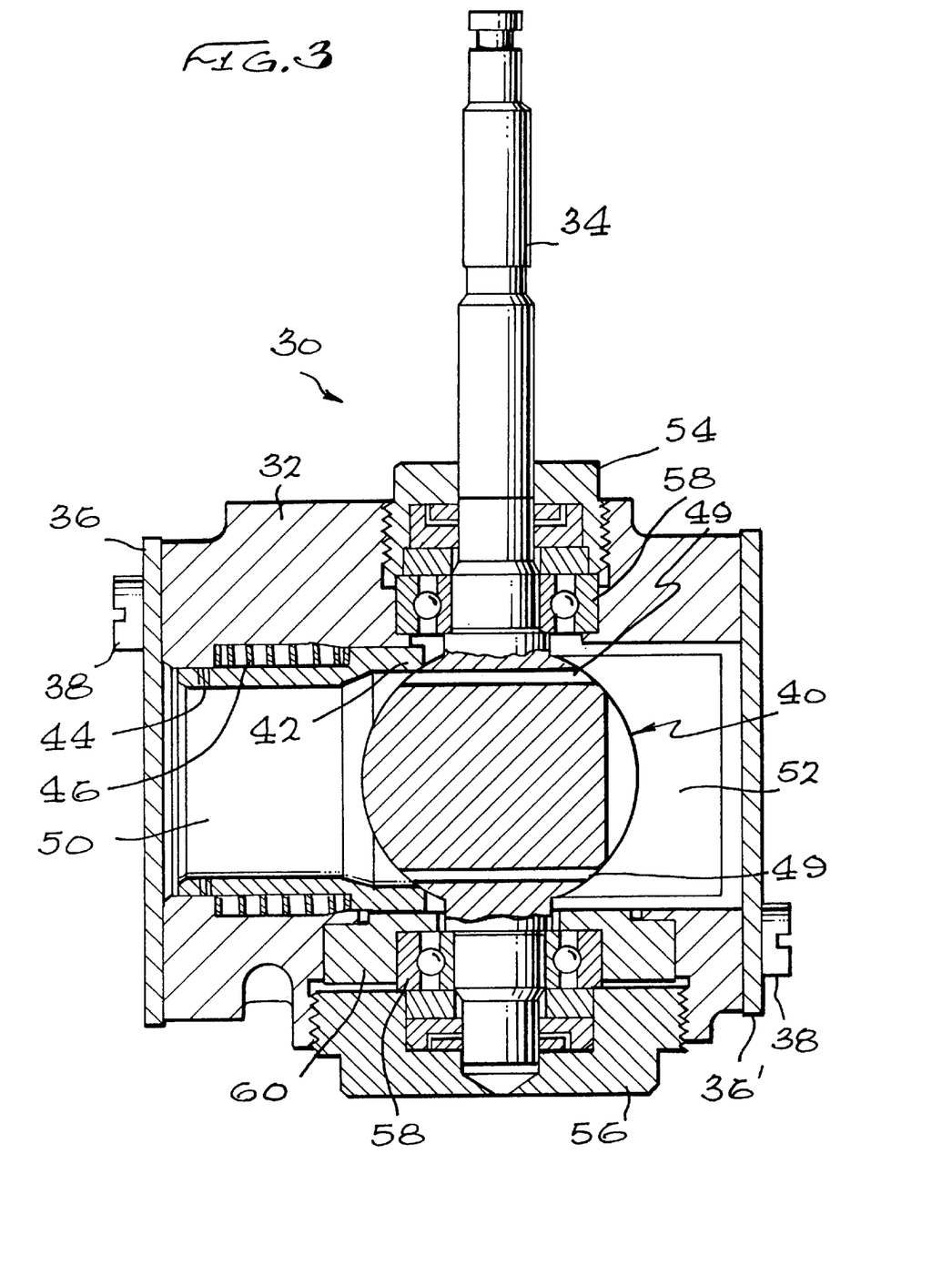
FIG. 3 is a sectional view of the ball valve, taken along the plane 3—3 of FIG. 2 and looking in the direction of the arrows.

FIGS. 2–5 show the structural elements of the ball valve 30 and their interrelationship in the valve. FIG. 2 is a view aligned with the flow axis, viewed from the inlet end of the valve. Valve member 40 is rotatably mounted in valve body 32 in contact with annular valve seat 42 disposed in inlet passageway 50 (FIG. 3). Valve member 40 is integrally formed with valve stem 34, which is rotatably mounted and extends through valve body 32. Valve stem 34 is held in place by bottom cap 56 and top cap 54. Thus, rotation of the valve stem 34 generates corresponding rotation of valve member 40.

Figure 6:
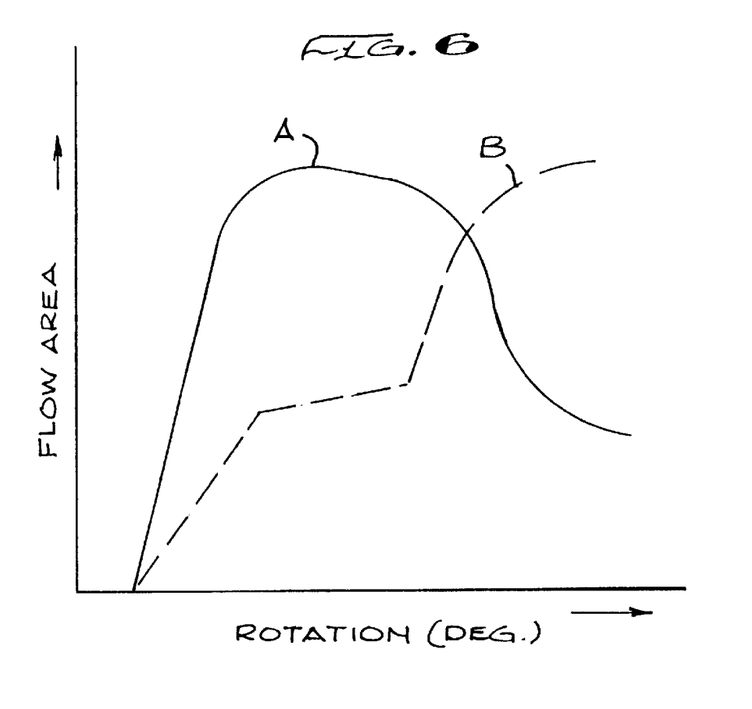
FIG. 6 is a graphical representation of flow area plotted as a function of rotation of the ball valve showing two exemplary waveforms that result from different flow passageway configurations for a ball valve of the present invention.

Flow passageway 48 is formed in valve member 40 to provide a desired cross-sectional flow area which varies with rotation (angular position) of valve stem 34 in a predetermined relationship. This relationship may be represented as a graphical waveform, the shape of which may be varied in accordance with the particular usage of the valve. For example, where it is desired to have fluid flow increase rapidly upon opening of the valve to near maximum flow and thereafter, as the valve is rotated further toward a full open position, drop off to a reduced flow rate and flow area, the solid line waveform A of FIG. 6 may be selected and the valve member be fabricated with a corresponding shape of the flow passageway. As an alternative example, where it may be desired to have fluid flow increase more gradually as the valve member is rotated away from the closed position, then maintained relatively constant for a second stage of valve member rotation, followed by an increase to the maximum fluid flow rate, the broken-line waveform B of FIG. 6 may be used as the basis for determining the shape of the flow passageway through the spherical valve member.

Figure 4:
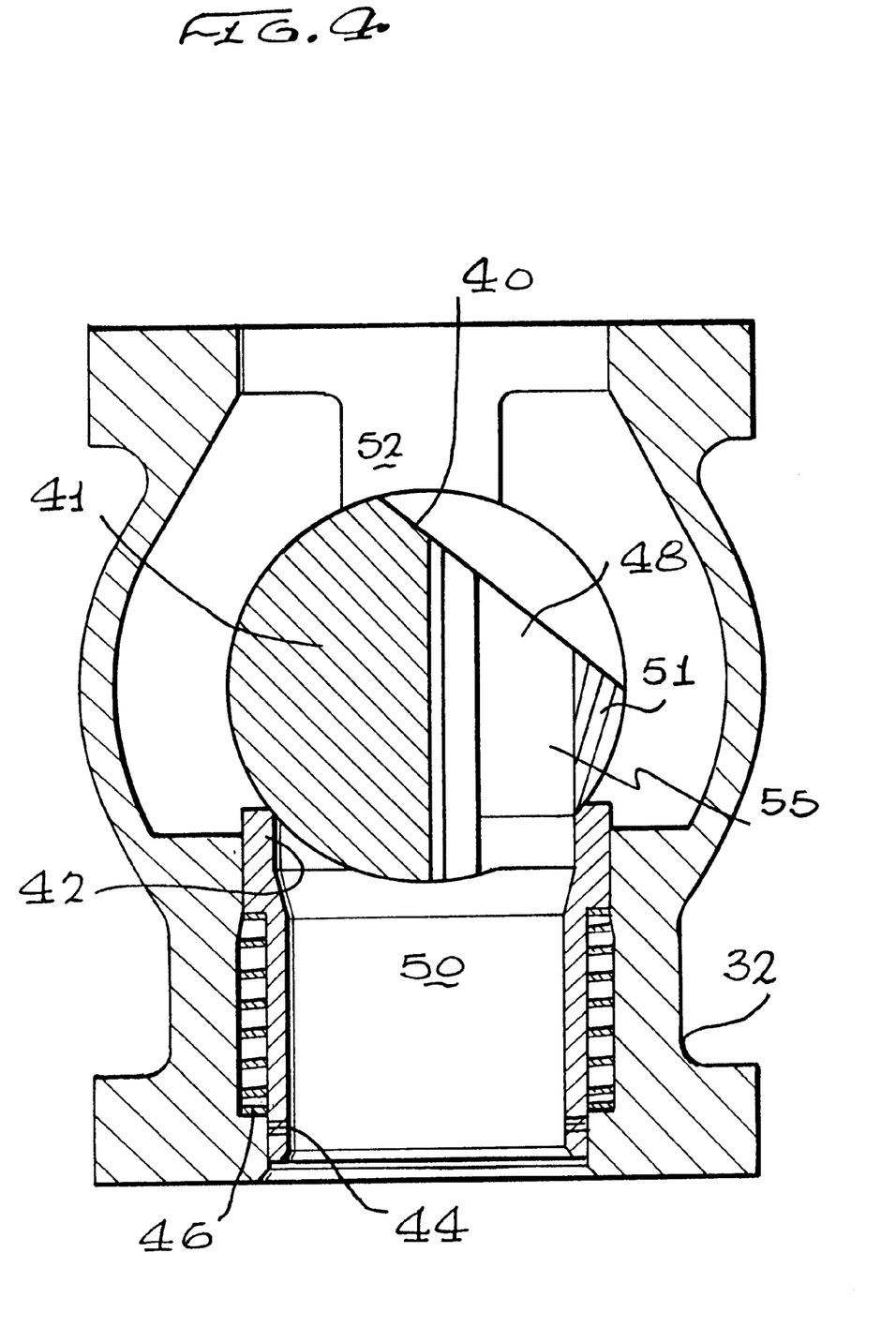
FIG. 4 is a sectional view of the ball valve, taken along the plane 4—4 of FIG. 2 and looking in the direction of the arrows.
Figure 5:
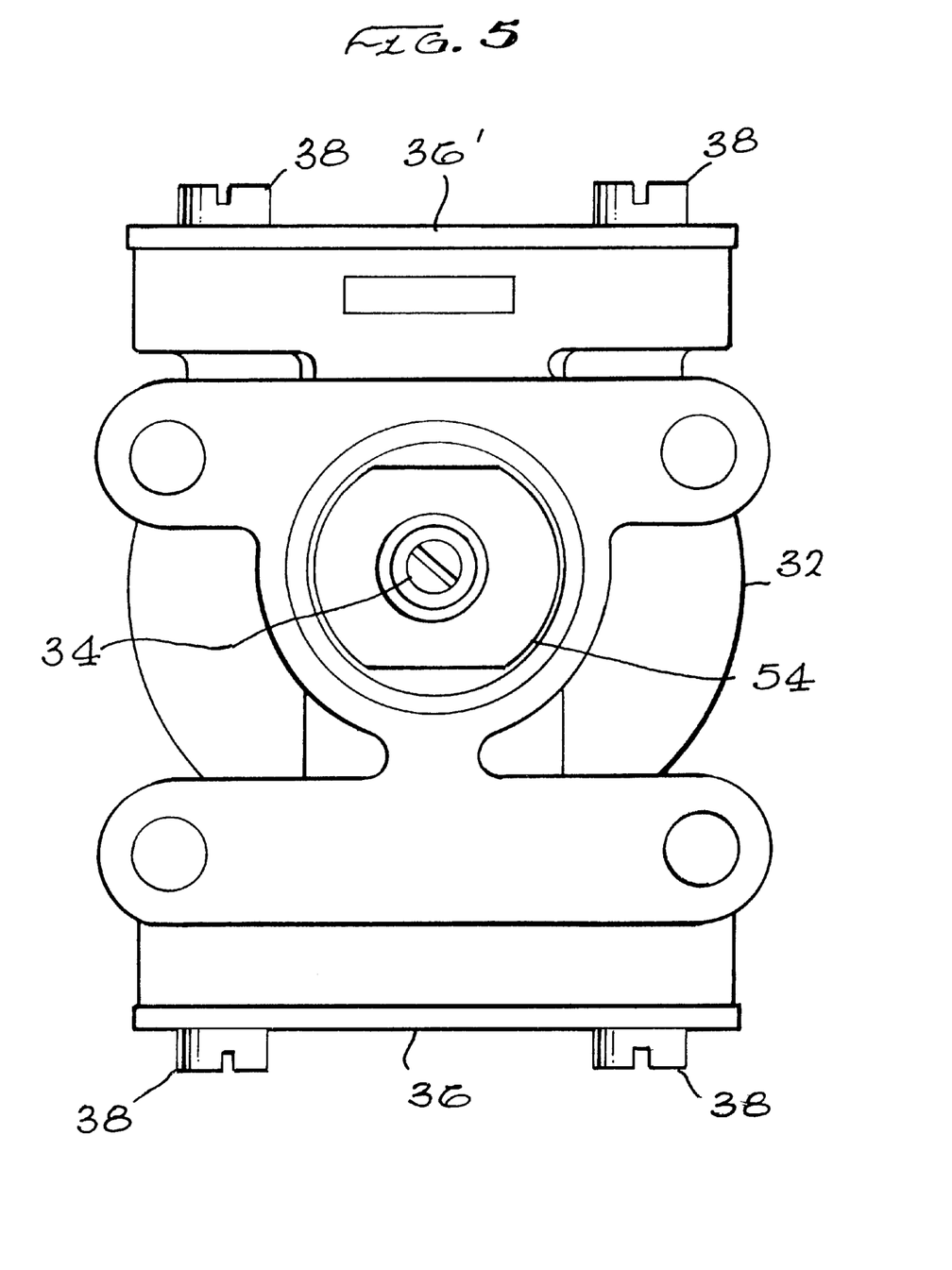
FIG. 5 is a plan view of the ball valve of FIG. 2.

Instantaneous flow area is developed by the shape of the bore along the extent of the flow passageway through the spherical ball member 40 to provide the desired flow area at each incremental rotation of the valve stem 34. As shown particularly in FIG. 2, portion 41 of the valve member 40 is solid material, whereas the portion 48 is the flow passageway. The valve member 40, as shown in FIG. 2, is symmetrical about the horizontal midplane 4—4. The flow passageway 48 extends slightly to the left of the vertical midplane 3—3, corresponding to the spaces 49 seen in the view of FIG. 3. The solid segment 51, visible in FIG. 4 but not seen in FIG. 2, provides the wall of the flow passageway 48 opposite the solid portion 41. The portions 41 and 51 are connected by walls on opposite sides of the flow passageway 48, one of which is depicted in FIG. 4 on the far side of the flow passageway 48, designated by reference numeral 55.

Further details of the ball valve 30 of the present invention may be seen in FIG. 3, a sectional view along plane 3—3 of FIG. 2. Valve body 32 of ball valve 30 includes an inlet passageway 50 and an outlet passageway 52. In the open valve position, flow passageway 48 connects inlet 50 and outlet 52.

Valve member 40 is rotatably disposed in valve body 32 between inlet passageway 50 and outlet passageway 52. Valve member 40 is rotated by valve stem 34. Valve member 40 contacts annular seat 42, which operates in cooperation with piston ring 44 and coil spring 46 to provide pressure-balanced operation. Valve stem 34 is supported by bearings 58, retainer 60, top cap 54 and bottom cap 56 to maintain smooth rotation. Shipping closure 36 and 36' are retained by screws 38 to protect internal components of the valve 30 from damage in transit.

As can be seen in FIG. 3, annular valve seat 42 is shaped to provide a larger diameter at its proximal end adjacent to valve member 40 than the diameter at its distal end where it engages valve body 32 via piston-type ring 44. This results in a net differential area which, when the inlet chamber is pressurized by fluid within the inlet passageway 50, develops a force acting against the biasing force of the compression spring 46. This small differential is designed to develop enough force to maintain low leakage and at the same time reduce the torque required to rotate the valve member 40 out of the closed position where the pressure is highest. The result is an almost pressure-balanced design which automatically produces a limited force that acts in conjunction with the force of the compression spring 46 in accordance with the pressure in the inlet passageway 50, thereby ensuring maintenance of a high-quality valve seal, while greatly reducing torque requirements for valve operation.

Although there have been described hereinabove various specific arrangements of a ball valve apparatus in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention as defined in the annexed claims.

What is claimed is:

1. Ball valve apparatus comprising:
 a housing;
 a first ball valve mounted in said housing;
 a second ball valve mounted in said housing side-by-side with said first ball valve;
 linear actuating means secured to said housing for operating said first and second ball valves; and
 linkage means interconnecting said linear actuating means and said first and second ball valves for translating linear motion of said actuating means to variable rotational motion of said first and second ball valves;
 wherein said linkage means comprise a yoke member extending transversely between said first and second ball valves, means for coupling said linear actuating means to said yoke member, and first and second linkages pivotably connected between opposed ends of said yoke member and said first and second ball valves, respectively.

2. The apparatus of claim 1 wherein said linear actuating means comprise a cylinder and piston actuator member.

3. The apparatus of claim 1 wherein each of said ball valves comprises a substantially spherical valve member mounted for rotation between an open position and a closed position and an attached valve stem for causing said valve member to rotate.

4. The apparatus of claim 3 wherein said first and second linkages comprise first and second crank members, each being selectively positioned on a corresponding valve stem, each of said first and second linkages having at least one link pivotably connected to a corresponding crank member.

5. The apparatus of claim 4 wherein said first and second crank members are mounted, respectively, on corresponding valve stems at predetermined angular positions selected to control individual valve member rotation.

6. The apparatus of claim 5 wherein mounting said crank members at different predetermined angular positions on said valve stems results in different rates of rotation of said valve members between said open and closed positions.

7. The apparatus of claim 5 wherein mounting said crank members at different predetermined angular positions on said valve stems results in different degrees of rotational movement of the valve members for a given movement of said linear actuating means.

8. The apparatus of claim 5 wherein each of said valve members contains a flow passageway for permitting fluid flow through said each valve member when said valve member is rotated away from the closed position.

9. The apparatus of claim 8 wherein mounting said crank members at different predetermined angular positions on said valve stems results in different rates of fluid flow through said first and second ball valves at a particular position of said linear actuating means.

10. The apparatus of claim 9 wherein coordination of the angular position of a crank member on a valve stem and the shape of the flow passageway through the corresponding valve member results in the flow rate of fluid through that ball valve corresponding to a predetermined waveform.

11. The apparatus of claim 10 wherein each valve member is fabricated so that the transverse cross-section of the valve member flow passageway varies in a predetermined manner from inlet to outlet in accordance with a preselected waveform of flow rate as a function of angular position of the valve member.

12. The apparatus of claim 1 wherein said first ball valve comprises a valve body defining a cylindrical inlet passageway, a cylindrical outlet passageway axially aligned with the inlet passageway, and a stem passageway extending through said valve body substantially orthogonally aligned to the inlet and outlet passageways;
 a valve stem mounted in the stem passageway defined by said valve body, and extending from a location outside said valve body to a location within said valve body and between the inlet and outlet passageways;

a substantially spherical valve member integrally formed with said valve stem within said valve body and rotatably mounted in said valve body between the inlet and outlet passageways, said valve member having a flow passageway extending therethrough, said flow passageway having a three-dimensional shape providing a flow area which varies in relation to the degree of valve member rotation in accordance with a preselected waveform.

13. The ball valve of claim 12 further comprising a pressure-balanced design which is effective in reducing the sealing force on said valve member when the valve is in the closed position.

14. Ball valve apparatus comprising:

a housing;

a first ball valve mounted in said housing;

a second ball valve mounted in said housing;

linear actuating means secured to said housing for operating said first and second ball valves; and linkage means interconnecting said linear actuating means and said first and second ball valves for translating linear motion of said actuating means to variable rotational motion of said first and second ball valves;

wherein said first ball valve comprises a valve body defining a cylindrical inlet passageway, a cylindrical outlet passageway axially aligned with the inlet passageway, and a stem passageway extending through said valve body substantially orthogonally aligned to the inlet and outlet passageways;

a valve stem mounted in the stem passageway defined by said valve body, and extending from a location outside said valve body to a location within said valve body and between the inlet and outlet passageways;

a substantially spherical valve member integrally formed with said valve stem within said valve body and rotatable mounted in said valve body between the inlet and outlet passageways, said valve member having a flow passageway extending therethrough, said flow passageway having a three-dimensional shape providing a flow area which varies in relation to the degree of valve member rotation in accordance with a preselected waveform;

said first ball valve further comprising a pressure-balanced design which includes an annular seat adjacent said ball valve member and extending into the inlet passageway, said annular seat having a proximal end diameter adjacent the ball valve member that is larger than a distal end diameter within the inlet passageway, said pressure-balanced design further having a helical spring mounted at the distal end for urging said annular seat in the direction of said valve member.

* * * * *